(12) United States Patent
Mori

(10) Patent No.: US 10,677,614 B2
(45) Date of Patent: Jun. 9, 2020

(54) ENCODER

(71) Applicant: Mitutoyo Corporation, Kawasaki, Kanagawa (JP)

(72) Inventor: Hiroatsu Mori, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 81 days.

(21) Appl. No.: 15/943,417

(22) Filed: Apr. 2, 2018

(65) Prior Publication Data
US 2018/0292238 A1 Oct. 11, 2018

(30) Foreign Application Priority Data

Apr. 6, 2017 (JP) ................. 2017-076103

(51) Int. Cl.
G01D 5/244 (2006.01)
G01D 5/20 (2006.01)
G01D 3/08 (2006.01)
G01D 5/245 (2006.01)
G01D 5/347 (2006.01)

(52) U.S. Cl.
CPC ........... *G01D 5/24457* (2013.01); *G01D 3/08* (2013.01); *G01D 5/206* (2013.01); *G01D 5/2457* (2013.01); *G01D 5/34715* (2013.01)

(58) Field of Classification Search
CPC .... G01D 5/24457; G01D 3/08; G01D 5/2457; G01D 5/34715
See application file for complete search history.

(56) References Cited

U.S. PATENT DOCUMENTS

2007/0144026 A1* 6/2007 Mitchell ................ G01D 5/347
33/707

FOREIGN PATENT DOCUMENTS

EP 1 729 097 A1 12/2006
JP 4838117 10/2011

* cited by examiner

*Primary Examiner* — Georgia Y Epps
*Assistant Examiner* — Don J Williams
(74) *Attorney, Agent, or Firm* — Rankin, Hill & Clark LLP

(57) ABSTRACT

Provided is an encoder that can sense an abnormality in the attitude of a detector with respect to a scale. An encoder includes a scale and a detector, the scale being provided on one measurement target part with marks arranged on the scale, and the detector being provided on another measurement target part and configured to detect an amount of relative movement with the scale. The scale includes a sensing unit that senses the attitude of the detector with respect to the scale, and thus even in a case where an abnormality in the attitude of the detector with respect to the scale cannot be sensed on the basis of a change in a signal read by a reading unit, the abnormality can nevertheless be sensed.

12 Claims, 15 Drawing Sheets

ENCODER

TECHNICAL FIELD

The present invention relates to an encoder that senses an abnormality in an attitude of a detector with respect to a scale.

BACKGROUND ART

An encoder in the related art that detects an amount of relative movement between a pair of measurement target parts that move relative to each other is known. The encoder includes a scale having marks, and a detector having a reading unit that moves along the scale. The detector detects an amount of relative movement between the scale and the detector on the basis of a signal read by the reading unit from the marks of the scale.

This encoder has a problem in that in a case where the detector is skewed relative to the scale or the like and the attitude of the detector with respect to the scale changes, the signal read by the reading unit changes as well, and the precision at which the amount of relative movement is detected will decrease as a result.

In response to this problem, for example, a photoelectric encoder disclosed in Patent Document 1 includes a main scale (a scale), and a light-receiving unit (a detector), having a light-receiving element (a reading unit) that receives light (a signal) via the main scale, that detects an amount of relative movement of the main scale from the light received by the light-receiving element. The photoelectric encoder has a first lens and a second lens between the main scale and the light-receiving unit. The first lens and second lens are identical, and the second lens and first lens are situated reversely. The photoelectric encoder has an aperture between the first lens and the second lens. The aperture is arranged at the position of the focal points of the first lens and the second lens, and has a slit extending in a direction along which the light-receiving unit moves relative to the main scale and a direction orthogonal to a vertical line on a face of the scale where the marks are arranged.

With the photoelectric encoder according to Patent Document 1, the second lens and the first lens being situated reversely makes it possible to inversely correct aberration arising in the first lens due to the light-receiving unit being skewed relative to the main scale or the like. Additionally, because the aperture is arranged at the position of the focal point of the second lens, the light emitted to the light-receiving element from the second lens can be made into parallel light. The photoelectric encoder therefore inversely corrects aberration using the second lens and makes the light into parallel light using the aperture, and thus even in a case where the light-receiving unit is distanced from the main scale, for example, the same amount of light can be emitted to the light-receiving element as if the light-receiving unit was arranged in the normal position (not distanced from the main scale). The photoelectric encoder can therefore stabilize the detection precision of the amount of relative movement detected by the light-receiving unit and improve the reliability.

CITATION LIST

Patent Literature

Patent Document 1: JP 4838117 B

SUMMARY OF INVENTION

Technical Problem

In the related art, an abnormality in the attitude of the detector with respect to the scale is sensed on the basis of a signal read by the reading unit of the detector.

However, in such an encoder, the signal read by the reading unit does not easily change due to the lenses, the aperture, and the like, and there is thus a problem in that even in a case where an abnormality arises in the attitude of the detector with respect to the scale, that abnormality may not be able to be sensed.

An object of the invention is to provide an encoder that can sense an abnormality in the attitude of a detector with respect to a scale.

Solution to Problem

An encoder according to the invention includes a scale and a detector. The scale is provided on one measurement target part with marks arranged on the scale, and the detector is provided on another measurement target part and configured to detect an amount of relative movement with the scale. The scale includes a sensing unit configured to sense an abnormality in an attitude of the detector with respect to the scale.

According to this configuration, the scale includes the sensing unit that senses the attitude of the detector with respect to the scale, and thus even in a case where an abnormality in the attitude of the detector with respect to the scale cannot be sensed on the basis of a signal read by a reading unit, the abnormality can nevertheless be sensed.

Here, it is preferable that the detector include a rolling member configured to roll in contact with the scale when the attitude is normal, and that the sensing unit be configured to sense an abnormality in the attitude of the detector with respect to the scale by sensing whether the rolling member is in contact with the scale.

According to this configuration, the attitude of the detector with respect to the scale is the normal attitude when the rolling member is in contact with a face of the scale. However, the rolling member will be lifted from the face of the scale in a case where the detector is, for example, arranged tilted in the roll direction, the pitch direction, or the yaw direction with respect to the scale.

Note that the roll direction is a direction of rotation taking the arrangement direction of the marks on the scale as an axis, the pitch direction is a direction of rotation taking the width direction of the scale as an axis, and the yaw direction is a direction of rotation taking a direction orthogonal to the roll direction and the pitch direction as an axis.

Specifically, when the detector includes three rolling members arranged in a substantially triangular shape, for example, at least one of the three rolling members will be lifted from the face of the scale in a case where the detector is arranged tilted in the roll direction, the pitch direction, or the yaw direction with respect to the scale. Additionally, all three of the rolling members will be lifted from the face of the scale in a case where the detector is arranged skewed in a direction distanced from the scale (a gap direction).

According to the invention, the sensing unit can sense the attitude of the detector with respect to the scale as being normal when the rolling member is in contact with the scale, and can sense the attitude of the detector with respect to the scale as being abnormal when the rolling member is not in contact with the scale.

Accordingly, the sensing unit can sense an abnormality in the attitude of the detector with respect to the scale on the basis of whether the rolling member is in contact with the scale, even in a case where an abnormality in the attitude of the detector with respect to the scale cannot be sensed on the basis of a signal read by a reading unit.

Here, it is preferable that the detector include the rolling member, the rolling member being conductive; that the sensing unit include a sensing portion, the sensing portion having a film form and being applied a voltage; that the sensing unit be configured to sense the rolling member as being in contact with the scale when the voltage applied to the sensing portion changes; and that the sensing unit be configured to sense the rolling member as not being in contact with the scale when the voltage applied to the sensing portion does not change.

Here, the voltage applied to the sensing portion changes when the conductive rolling member makes contact with the sensing portion.

According to the invention, the sensing unit can sense the rolling member as being in contact with the scale and the attitude of the detector as normal when the voltage applied to the sensing portion changes, and can sense the rolling member as not being in contact with the scale and the attitude of the detector as abnormal when the voltage applied to the sensing portion does not change. Accordingly, because the detector includes the conductive rolling member, the sensing unit can sense an abnormality in the attitude of the detector with respect to the scale from changes in the voltage at the sensing portion. Additionally, the sensing unit includes the sensing portion having a film form, and thus the encoder can achieve greater space conservation than in a case where a sensor or the like is provided for sensing the attitude of the detector with respect to the scale.

Here, it is preferable that the scale include a measurement area and a sensing area, the measurement area being an area where the amount of relative movement is detected by the detector from the marks, and the sensing area being an area including the sensing unit and provided outside the measurement area.

The sensing portion having a film form of the sensing unit is formed from a metal such as chromium (Cr), for example, and is subject to wear when coming into contact with the rolling member. The encoder can experience detection malfunctions due to wear debris produced due to wear on the sensing portion having a film form.

According to the invention, the scale includes the measurement area and the sensing area, and thus the measurement of the amount of relative movement between the scale and the detector can be carried out in the measurement area, and the sensing of an abnormality in the attitude of the detector with respect to the scale can be carried out in the sensing area.

In other words, the detector moves within the measurement area during measurement and does not cause the rolling member to come into contact with the sensing portion, and thus the production of wear debris due to wear on the sensing portion can be suppressed.

Additionally, the sensing area is provided outside the measurement area, and thus the encoder can sense an abnormality in the attitude of the detector with respect to the scale by moving the detector to the sensing area when sensing the state of the detector.

Here, it is preferable that the detector includes the rolling member including a plurality of rolling members; that the scale includes a sensing position for the sensing unit to sense an abnormality in the attitude of the detector; and that the sensing unit includes the sensing portion including a plurality of sensing portions provided in positions, in the sensing position, that match the plurality of rolling members.

According to this configuration, the sensing unit includes the plurality of sensing portions provided in positions matching the positions of the plurality of rolling members, in the sensing position, and thus the plurality of sensing portions provided in the sensing position correspond one-to-one with the plurality of rolling members. The sensing unit can sense the states of each of the rolling members simultaneously by moving the detector to the sensing position so that the plurality of rolling members come into contact with the plurality of sensing portions.

Additionally, the encoder can, in the case where the attitude of the detector with respect to the scale is abnormal, identify which of the plurality of rolling members is not in contact with the scale by using the plurality of sensing portions provided in the sensing position. The encoder can then sense the manner in which the attitude of the detector with respect to the scale is skewed relative to the scale by identifying the rolling members not in contact with the scale.

Here, it is preferable that the detector include a first rolling member and a second rolling member; that the scale include a first sensing position and a second sensing position for the sensing unit to sense an abnormality in the attitude of the detector; that the sensing unit include a first sensing portion provided in a position that matches only the first rolling member when the detector is located in the first sending position, and a second sensing portion provided in a position that matches only the second rolling member when the detector is located in the second sensing position; and that a common voltage be applied to the first sensing portion and the second sensing portion.

In a case where, when the configuration is such that all of the plurality of rolling members make contact with the plurality of sensing portions at once, individual voltages are applied to each of the plurality of sensing portions, the voltage will change even in a case where there is a rolling member not in contact with the scale because any one of other rolling members will come into contact with one of the plurality of sensing portions. The sensing unit therefore cannot sense the contact of the rolling member.

According to the invention, the first sensing portion provided in a position matching only the first rolling member when the detector is located at the first sensing position and the second sensing portion provided in a position matching only the second rolling member when the detector is located at the second sensing position are provided in the sensing unit. Because only the first sensing portion and the first rolling member make contact at the first sensing position and only the second sensing portion and the second rolling member make contact at the second sensing position, the sensing unit can identify which of the rolling members is not in contact with the scale even in a case where individual voltages are not applied to each of the plurality of sensing portions.

The encoder can then sense the manner in which the attitude of the detector with respect to the scale is skewed relative to the scale by identifying the rolling members not in contact with the scale. Additionally, the first sensing portion and the second sensing portion can sense the attitude of the detector with respect to the scale from a common voltage that is applied. Accordingly, it is not necessary to apply individual voltages to each of the plurality of sensing portions, and thus the encoder can achieve cost reduction.

Here, it is preferable that the rolling member be grounded via the detector; that the sensing unit include a conductive layer exhibiting conductivity formed on the scale along the arrangement direction of the marks; and that the sensing portion be formed extending from the conductive layer in a direction intersecting with the arrangement direction of the marks on the scale.

The scale, which is formed from glass or the like, may become charged as the rolling members roll in contact with the face of the scale. Discharging the charge in the scale can cause disturbances in the electric system of the detector (voltages, frequencies, and the like) and produce noise. Additionally, when the scale is charged, it is easy for dust to stick to the scale, the detector, or the like, which can cause detection malfunctions and the like.

However, according to this configuration, the rolling members are grounded via the detector, and thus a charge in the scale can be discharged simply by bringing the rolling members and the sensing portions into contact with each other.

DESCRIPTION OF EMBODIMENTS

A first embodiment of the invention will be described hereinafter on the basis of the drawings.

Figure 1A:
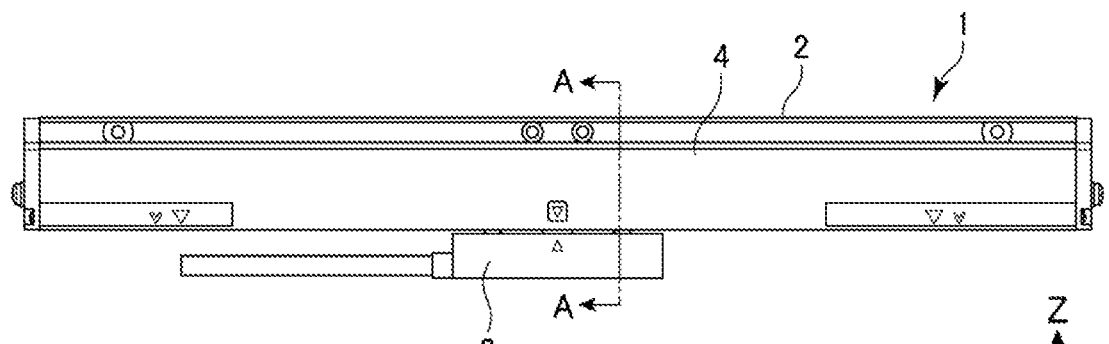
FIGS. 1A and 1B are a front view and a cross-sectional view of an encoder according to a first embodiment.
Figure 1B:
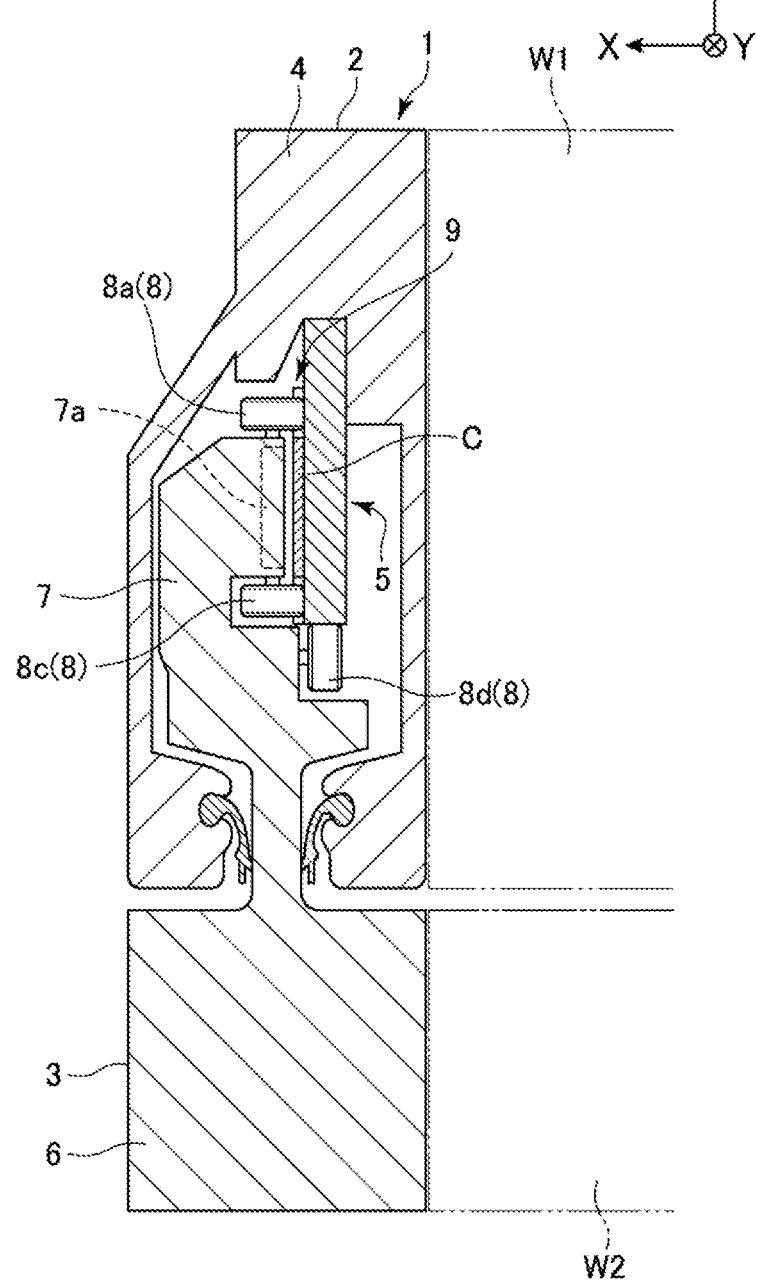

FIGS. 1A and 1B are a front view and a cross-sectional view of an encoder according to the first embodiment. More specifically, FIG. 1A is a front view of an encoder 1, and FIG. 1B is a cross-sectional view of the encoder 1 seen from the A-A cross section in FIG. 1A.

As illustrated in FIGS. 1A and 1B, the encoder 1 is a measurement device that measures a distance of movement between a pair of measurement target parts W1 and W2 that move relative to each other. The encoder 1 is an electromagnetic induction-type linear encoder, for example.

The encoder 1 includes an encoder main unit 2 and a detector 3 provided movably in the encoder main unit 2. In the encoder 1, the pair of measurement target parts W1 and W2 are attached by fixing the one measurement target part W1 to the encoder main unit 2 and fixing the other measurement target part W2 to the detector 3.

The encoder main unit 2 is constituted by a long scale frame 4 and a scale 5 provided within the scale frame 4. The scale frame 4 is formed from an aluminum alloy extrusion molding member and the like, and is formed having an overall substantially hollow rectangular shape.

In the following descriptions and the drawings, a direction corresponding to both a longitudinal direction of the scale frame 4 and a movement direction of the detector 3 may be referred to as an X direction; a width direction of the scale frame 4 (a depth direction) orthogonal to the X direction may be referred to as a Y direction; and a vertical direction orthogonal to both the X and Y directions may be referred to as a Z direction.

The detector 3 includes a detector main unit 6 provided outside the scale frame 4 and fixed to the other measurement target part W2, and a detection unit 7 provided extending into the scale frame 4 from the detector main unit 6.

The detection unit 7 includes a reading unit 7a that reads an amount of relative movement between the detector 3 and the scale 5, and bearings 8 which are rolling members, connected to the detection unit 7, that make contact with faces of the scale 5 and roll when the detector 3 is at a normal attitude with respect to the scale 5. The reading unit 7a includes an excitation coil and a detection coil. When the encoder 1 applies current to the excitation coil, the excitation coil produces a magnetic flux and causes a magnetic flux to arise in marks C opposite the excitation coil. The magnetic flux arising in the marks C furthermore causes a magnetic flux to arise in the detection coil of the reading unit 7a opposite the marks C. The detection coil reads an amount of displacement in the magnetic flux arising in the marks C and detects the amount of relative movement between the detector 3 and the scale 5.

Figure 2:
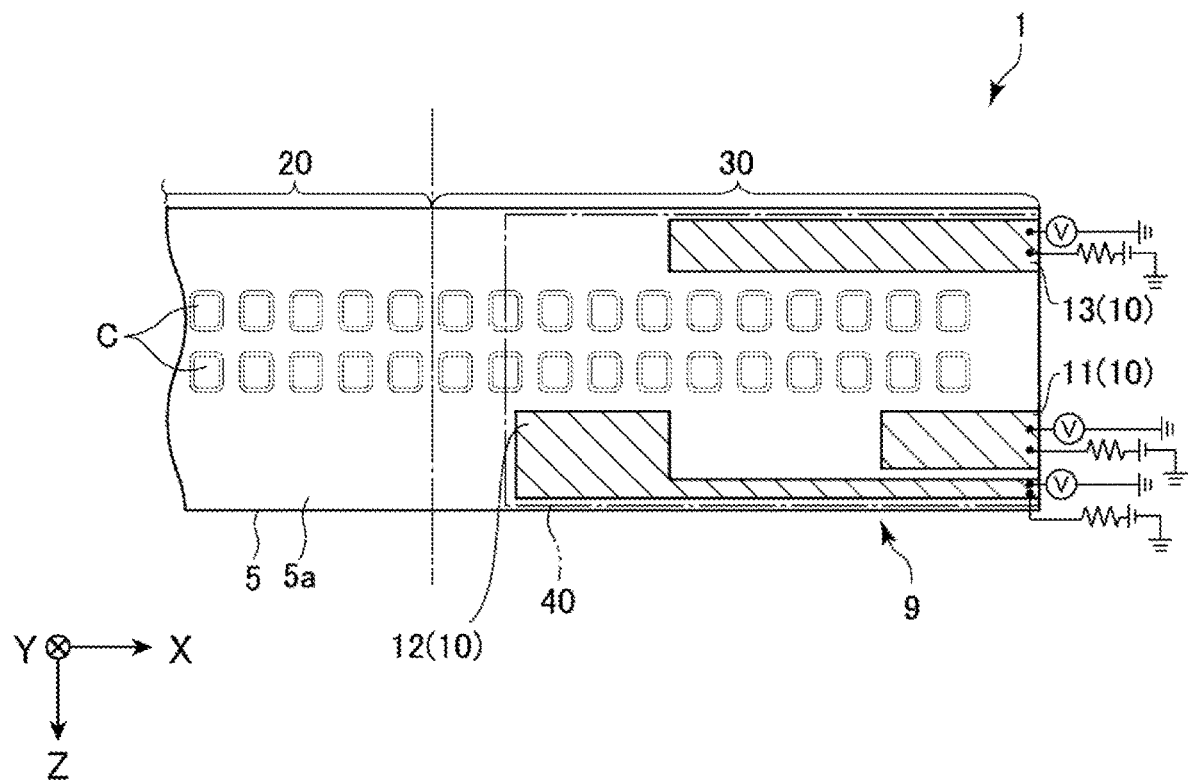
FIG. 2 is a front view of a scale and a sensing unit of the encoder.

FIG. 2 is a front view illustrating the scale and a sensing unit of the encoder. Specifically, FIG. 2 is a diagram viewing the scale 5 from a −Y direction side.

As illustrated in FIG. 2, the scale 5 includes a long scale base member 5a constituted of glass or the like, a sensing unit 9 that senses an abnormality in the attitude of the detector 3 with respect to the scale 5, and the marks C constituted of coils arranged at a constant pitch in the longitudinal direction (the X direction) of the scale base member 5a. The marks C are formed from a conductor such as copper (Cu).

The sensing unit 9 has sensing portions 10 to which voltage is applied. The sensing portions 10 include sensing portions 11, 12, and 13, which are formed from a conductor, such as chromium (Cr), having a film form. The sensing portions 10 will be described in detail later.

The scale 5 further includes a measurement area 20 where the amount of relative movement is detected by the detector 3 from the marks C, and a sensing area 30 which includes the sensing unit 9 and is provided outside the measurement area 20.

The measurement area 20 is formed continuously along the longitudinal direction (the X direction) of the scale base member 5a. As such, the detector 3 carries out measurement within the measurement area 20 without passing through the sensing area 30.

The sensing area 30 includes a sensing position 40 for sensing an abnormality in the attitude of the detector 3 using the sensing unit 9, and is formed at an end portion on one end side (the +X direction side) of the scale base member 5a in the longitudinal direction. Note that the sensing area 30 may be provided only at an end portion at one end side (the +X direction side) of the scale base member 5a in the longitudinal direction, only at an end portion at the other end side (the −X direction side) of the scale base member 5a in the longitudinal direction, or at both ends of the scale base member 5a.

Figure 3:
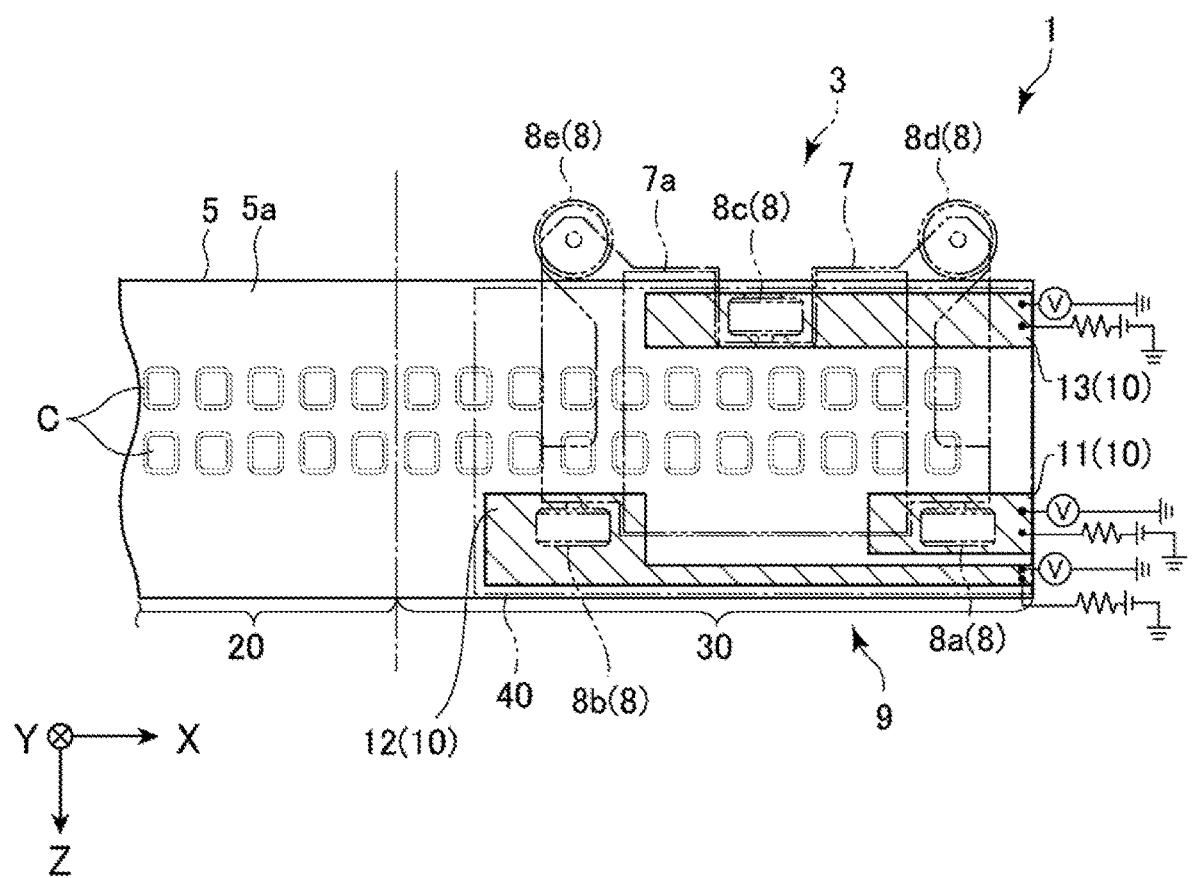
FIG. 3 is a diagram illustrating a relationship between a detector and a sensing position in the encoder.

FIG. 3 is a diagram illustrating a relationship between the detector and the sensing position in the encoder.

As illustrated in FIG. 3, the bearings 8 include conductive bearings 8a, 8b, 8c, 8d, and 8e. The bearings 8 are grounded via the detector 3 and the other measurement target part W2 (see FIG. 1B).

The bearing 8a is provided in a position where the bearing 8a rolls along the marks C. The bearing 8b is provided in a position where the bearing 8b rolls along the marks C, and rolls along the same path as the bearing 8a. The bearing 8c is provided in a position sandwiching the marks C, opposite to the bearings 8a and 8b, and rolls along a path parallel to the paths of the bearings 8a and 8b. The bearing 8d is provided in a position where the bearing 8d rolls in contact with a side face (on the −Z direction side) of the scale base member 5a. The bearing 8e is provided in a position where the bearing 8d rolls in contact with the side face (on the −Z direction side) of the scale base member 5a and rolls along the same path as the bearing 8d.

The sensing portion 11 is provided in a position matching the position of the bearing 8a when the detection unit 7 (the detector 3) stops at the sensing position 40. The sensing portion 12 is provided in a position matching the position of the bearing 8b when the detection unit 7 stops at the sensing position 40. The sensing portion 13 is provided in a position matching the position of the bearing 8c when the detection unit 7 stops at the sensing position 40.

The sensing portions 11, 12, and 13 are formed at sizes enabling reliable contact to be made with the bearings 8a, 8b and 8c within the sensing position 40. Specifically, the sensing portions 11, 12, and 13 are provided with lengths enabling the bearings 8a, 8b and 8c to roll for a certain distance in the X direction.

The sensing unit 9 senses an abnormality in the attitude of the detector 3 with respect to the scale 5 by moving the detection unit 7 to the sensing position 40 of the sensing area 30 and sensing whether the bearings 8 are in contact with the scale 5. Specifically, the sensing unit 9 senses the bearings 8 as being in contact with the scale 5 when a voltage applied to the sensing portions 10 changes, and senses the bearings 8 as not being in contact with the scale 5 when the voltage applied to the sensing portions 10 does not change. In this embodiment, the bearings 8 are grounded via the detector 3 and the other measurement target part W2, and thus the voltage changes to 0 when the bearings 8 and the sensing portions 10 are in contact.

Voltages are applied to the sensing portions 11, 12, and 13. As such, when, for example, only the bearing 8a is not in contact with the scale 5, the voltages applied to the sensing portions 12 and 13 change to 0 but the voltage applied to the sensing portion 11 does not change. Accordingly, the sensing unit 9 can sense which of the bearings 8 are not in contact with the scale 5, and by extension, can sense in what manner the attitude of the detector 3 is skewed relative to the scale 5, from changes in the voltage applied to the sensing portions 10.

Figure 4:
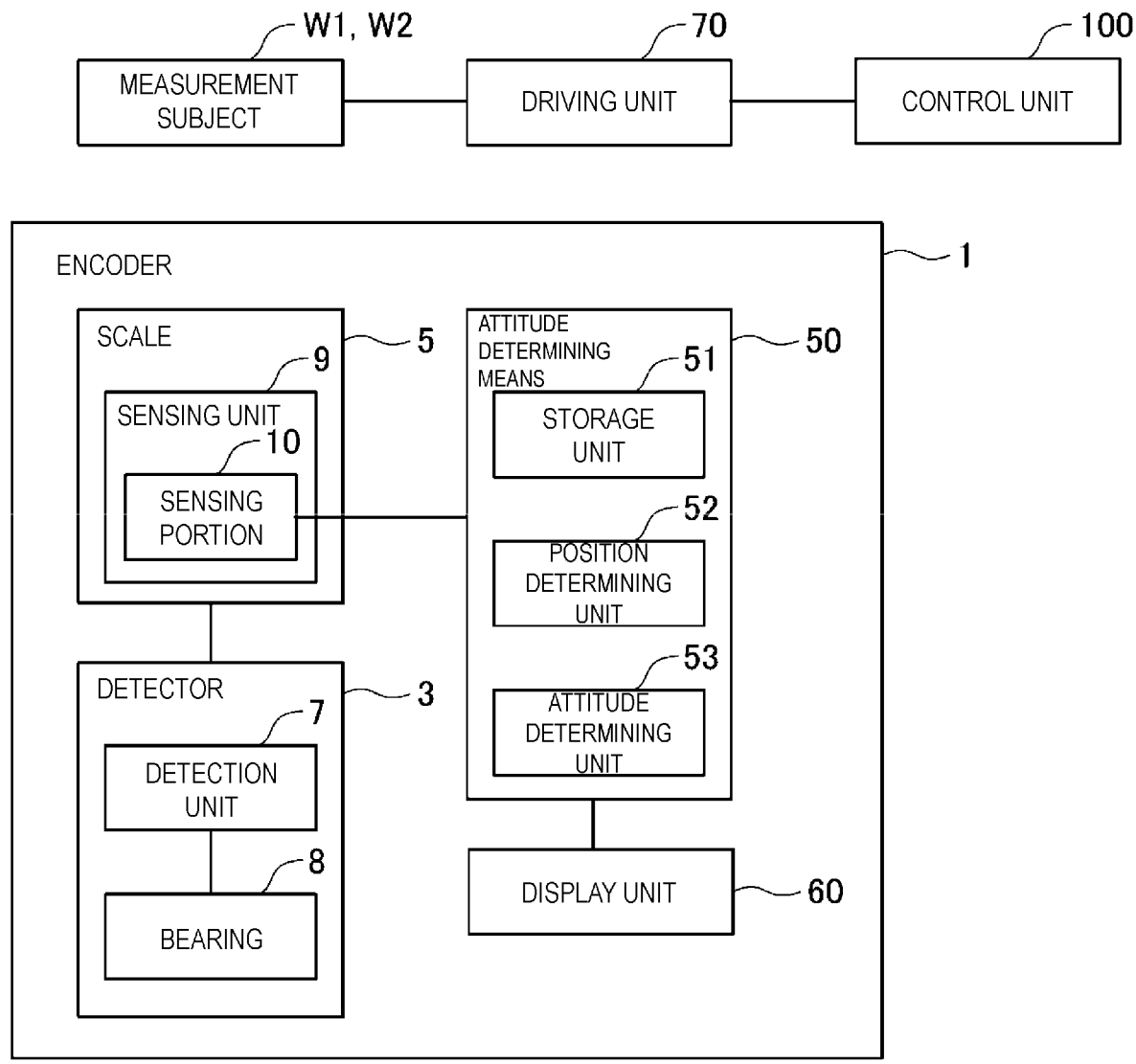
FIG. 4 is a block diagram illustrating the encoder.

FIG. 4 is a block diagram illustrating the encoder.

As illustrated in FIG. 4, the encoder 1 includes an attitude determining means 50 that determines the attitude of the detector 3 relative to the encoder 1, and a display unit 60 that displays information.

The pair of measurement target parts W1 and W2 to which the encoder 1 is attached (see FIG. 1B) include a control unit 100 that controls the pair of measurement target parts W1 and W2, and a driving unit 70 controlled by the control unit 100.

The driving unit 70 is a motor or the like that moves the scale 5 and the detector 3 fixed to the pair of measurement target parts W1 and W2 relative to each other.

The control unit 100 controls the driving unit 70 on the basis of determination results and the like from the attitude determining means 50 of the encoder 1. The control unit 100 controls the driving unit 70 to drive the other measurement target part W2 to which the detector 3 is fixed and move the detector 3 (the detection unit 7).

The attitude determining means 50 includes a storage unit 51 that stores sensing results from the sensing unit 9 of the scale 5, a position determining unit 52 that determines whether the detection unit 7 has moved to the sensing position 40, and an attitude determining unit 53 that determines the attitude of the detector 3 with respect to the scale 5 on the basis of the sensing results from the sensing unit 9.

The position determining unit 52 determines whether the detection unit 7 has moved to the sensing position 40 by reading from the marks C. Specifically, the position determining unit 52 compares a measurement value read by the reading unit 7a with sensing position information corresponding to the sensing position 40, stored in the storage unit 51 or the like in advance, and determines whether the detection unit 7 has moved to the sensing position 40. Note that the position determining unit 52 may determine whether the detection unit 7 has moved to the sensing position 40 by reading an alignment mark or the like provided on the scale 5.

The attitude determining unit 53 determines whether the attitude of the detector 3 with respect to the scale 5 is normal or abnormal from the state of contact between the bearings 8 and the sensing portions 10 sensed by the sensing unit 9.

The display unit 60 displays a result of the determination made by the attitude determining unit 53 using a light-emitting diode (LED), a display device, or the like. In this embodiment, the display unit 60 is a blue LED and a red LED (not illustrated). The blue LED lights up when the attitude of the detector 3 with respect to the scale 5 is normal, and the red LED lights up when the attitude of the detector 3 with respect to the scale 5 is abnormal.

Figure 5:
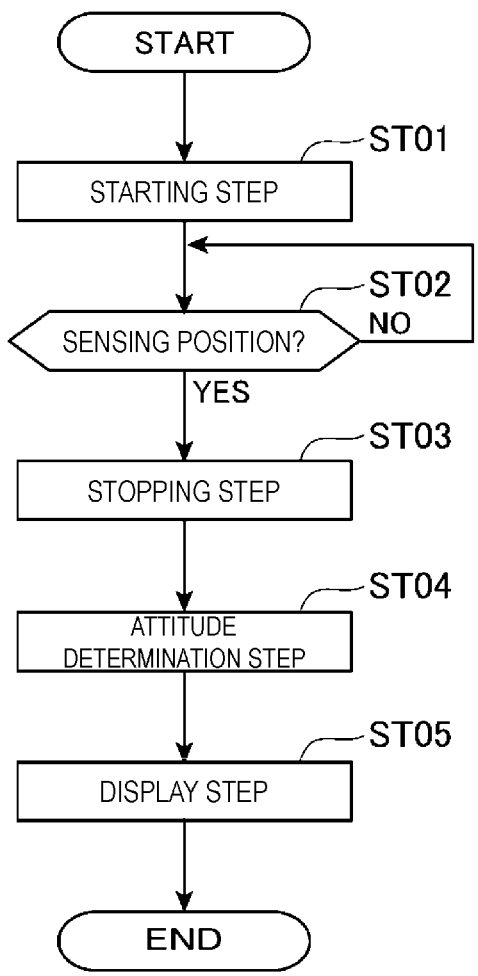
FIG. 5 is a flowchart illustrating a control method of the encoder.

FIG. 5 is a flowchart illustrating a control method of the encoder.

Operations through which the encoder 1 senses an abnormality in the attitude of the detector 3 will be described on the basis of FIG. 5.

As illustrated in FIG. 5, first, the control unit 100 executes a starting step of driving the other measurement target part W2 using the driving unit 70 and moving the detection unit 7 of the encoder 1 toward the sensing position 40 within the sensing area 30 (step ST01).

Next, the position determining unit 52 determines whether the detection unit 7 has moved to the sensing position 40 (step ST02). In the case where the position determining unit 52 determines that the detection unit 7 has not moved to the sensing position 40 (NO in step ST02), the control unit 100 drives the driving unit 70 and moves the detection unit 7 until it is determined that the detection unit 7 has moved to the sensing position 40. In the case where the position determining unit 52 determines that the detection unit 7 has moved to the sensing position 40 (YES in step ST02), the control unit 100 executes a stopping step of stopping the driving unit 70 so that the detection unit 7 stops at the sensing position 40 (step ST03).

Next, the sensing unit 9 executes an attitude determination step of determining the attitude of the detector 3 with respect to the scale 5 by sensing whether the bearings 8a, 8b and 8c included in the stopped detection unit 7 are in contact with the sensing portions 11, 12, and 13 provided at the sensing position 40, respectively (step ST04). The sensing result from the sensing unit 9 is saved in the storage unit 51.

The attitude determining unit 53 determines whether the bearings 8a, 8b and 8c are in contact with the sensing portions 11, 12, and 13, respectively, on the basis of the sensing result saved in the storage unit 51.

When the attitude determining unit 53 determines that the bearings 8a, 8b and 8c are in contact with the sensing portions 11, 12, and 13, respectively, the display unit 60 lights the blue LED up to indicate that the attitude of the detector 3 with respect to the scale 5 is normal (step ST05).

However, when the attitude determining unit 53 determines that any of the bearings 8a, 8b and 8c are not in contact with the sensing portions 11, 12, and 13, respectively, the display unit 60 lights the red LED up to indicate that the attitude of the detector 3 with respect to the scale 5 is abnormal (step ST05).

Note that as the attitude determination step, the attitude determining unit 53 may determine the manner in which the attitude of the detector 3 with respect to the scale 5 is abnormal from the bearings 8a, 8b and 8c and the sensing portions 11, 12, and 13 not in contact with each other as sensed by the sensing unit 9 (step ST04).

Specifically, in the case where, for example, the sensing unit 9 senses that the bearings 8a and 8b are in contact with the sensing portions 11 and 12 but the bearing 8c is not in contact with the sensing portion 13, the attitude determining unit 53 determines that the detector 3 is in an attitude in which the detector 3 is skewed in the roll direction relative to the scale 5. Likewise, in the case where the sensing unit 9 senses that the bearings 8b and 8c are in contact with the sensing portions 12 and 13 but the bearing 8a is not in contact with the sensing portion 11, the attitude determining unit 53 determines that the detector 3 is in an attitude in which the detector 3 is skewed in the pitch direction relative to the scale 5.

The result of the determination made by the attitude determining unit 53 is displayed by the display unit 60, such as a liquid crystal display (LCD) (step ST05).

According to this embodiment, the following effects can be achieved.

(1) The scale 5 includes the sensing unit 9 that senses the attitude of the detector 3 with respect to the scale 5, and thus even in a case where an abnormality in the attitude of the detector 3 with respect to the scale 5 cannot be sensed on the basis of a change in a signal read by the reading unit 7a, the abnormality can nevertheless be sensed.

(2) The sensing unit 9 can sense an abnormality in the attitude of the detector 3 with respect to the scale 5 from whether the bearings 8 are in contact with the scale 5, even in a case where an abnormality in the attitude of the detector 3 with respect to the scale 5 cannot be sensed on the basis of changes in a signal read by the reading unit 7a.

(3) Because the detector 3 includes the bearings 8, which are conductive rolling members, the sensing unit 9 can sense an abnormality in the attitude of the detector 3 with respect to the scale 5 from changes in the voltage at the sensing portions 10.

(4) The sensing unit 9 includes the sensing portions 10 having a film form, and thus the encoder 1 can achieve greater space conservation than in a case where a sensor or the like is provided for sensing the attitude of the detector with respect to the scale.

(5) The detector 3 moves within the measurement area 20 during measurement and does not cause the bearings 8 to come into contact with the sensing portions 10, and thus production of wear debris due to wear on the sensing portions 10 can be suppressed.

(6) The sensing area 30 is provided outside the measurement area 20, and thus the encoder 1 can sense an abnormality in the attitude of the detector 3 with respect to the scale 5 by moving the detector 3 in the sensing area 30 when sensing the state of the detector 3.

(7) The sensing unit 9 includes the plurality of sensing portions 11 to 13 provided in positions matching the positions of the plurality of bearings 8a to 8c, respectively, in the sensing position 40, and thus the plurality of sensing portions 11 to 13 provided in the sensing position 40 correspond one-to-one with the plurality of bearings 8a to 8c. The sensing unit 9 can sense the states of the bearings 8a to 8c simultaneously by moving the detector 3 to the sensing position 40 so that the plurality of bearings 8a to 8c come into contact with the plurality of sensing portions 11 to 13.

(8) The encoder 1 can, in the case where the attitude of the detector 3 with respect to the scale 5 is abnormal, identify which of the plurality of bearings 8a to 8c is not in contact with the scale 5 by using the plurality of sensing portions 11 to 13 provided in the sensing position 40. The encoder 1 can then sense the manner in which the attitude of the detector 3 with respect to the scale 5 is skewed with respect to the scale 5 by identifying the bearings 8a to 8c not in contact with the scale 5.

Second Embodiment

A second embodiment of the invention will be described hereinafter on the basis of the drawings. Note that in the following descriptions, parts that have already been described will be given the same reference signs, and descriptions thereof will be omitted.

In this embodiment, the bearing 8a corresponds to a first rolling member; the bearing 8c corresponds to a second rolling member; and the bearing 8b corresponds to a third rolling member.

Figure 6:
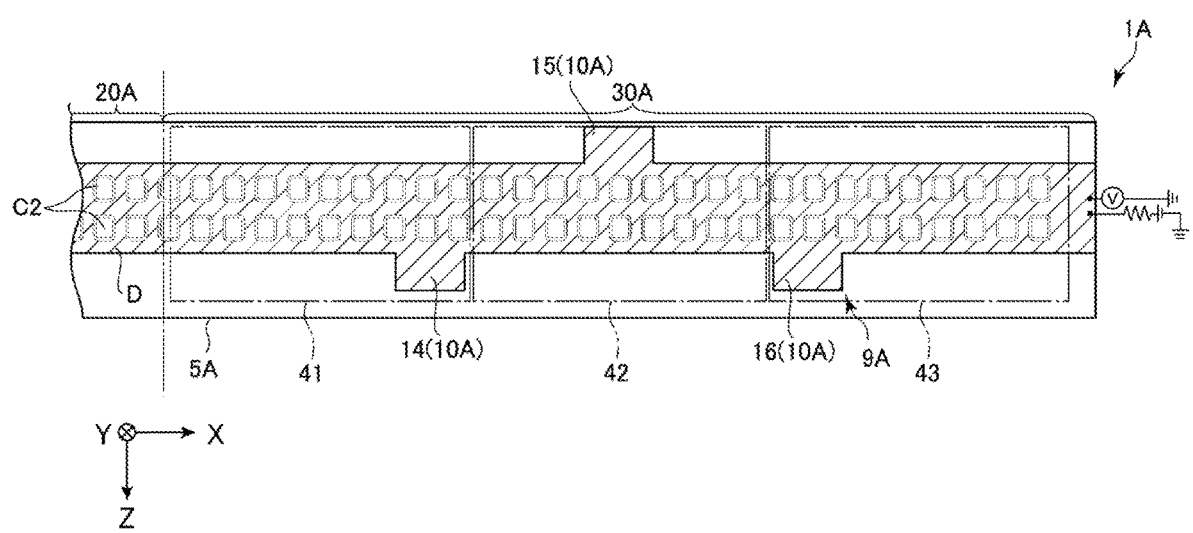
FIG. 6 is a front view of a scale and a sensing unit of an encoder according to a second embodiment.

FIG. 6 is a front view of a scale and a sensing unit of an encoder according to the second embodiment.

The sensing unit 9 of the encoder 1 according to the first embodiment includes the sensing portions 10 provided in positions corresponding one-to-one with the bearings 8 in the sensing position 40.

As illustrated in FIG. 6, a sensing unit 9A of an encoder 1A according to this embodiment differs from the sensing unit 9 according to the first embodiment in that the sensing unit 9A further includes a conductive layer D exhibiting conductivity and marks C2 formed on the conductive layer D and constituted of coils arranged at a constant pitch, and that sensing portions 10A are formed extending from the conductive layer D.

The conductive layer D is a conductor such as chromium (Cr), and is formed in a linear shape, on a −Y direction-side face of a scale 5A, along the longitudinal direction (the X direction).

The marks C2 are formed from a conductor such as copper (Cu) that has a higher conductivity than the conductive layer D. Note that any conductors may be used for the conductive layer D and the marks C2 as long as the marks C2 have a higher conductivity than the conductive layer D.

The sensing portions 10A are formed extending from the conductive layer D in a direction (the Z direction) intersecting with an arrangement direction (the X direction) of the marks C2 of the scale 5A.

The measurement area 20 of the scale 5 according to the first embodiment includes the marks C, and the sensing area 30 includes the sensing position 40 in which the plurality of sensing portions 11, 12, and 13 are provided.

A measurement area 20A of the scale 5A according to this embodiment differs from that of the first embodiment in that the measurement area 20A includes marks C2 formed on the conductive layer D. A further difference from the first embodiment is that a sensing area 30A includes a first sensing position 41 corresponding to the bearing 8a, which corresponds to the first rolling member, a second sensing position 42 corresponding to the bearing 8c, which corresponds to the second rolling member, and a third sensing position 43 corresponding to the bearing 8b, which corresponds to the third rolling member.

A voltage is applied to each of the plurality of sensing portions 11, 12, and 13 in the first embodiment. A plurality of sensing portions 14, 15, and 16 according to this embodiment differ from the first embodiment in that a voltage is applied thereto in common through the conductive layer D. In other words, in this embodiment, a voltage is applied to the conductive layer D.

The first sensing position 41 includes a first sensing portion 14 provided in a position matching only the bearing 8a, which corresponds to the first rolling member. The second sensing position 42 includes a second sensing portion 15 provided in a position matching only the bearing 8c, which corresponds to the second rolling member. The third sensing position 43 includes a third sensing portion 16 provided in a position matching the bearing 8b.

Figure 7:
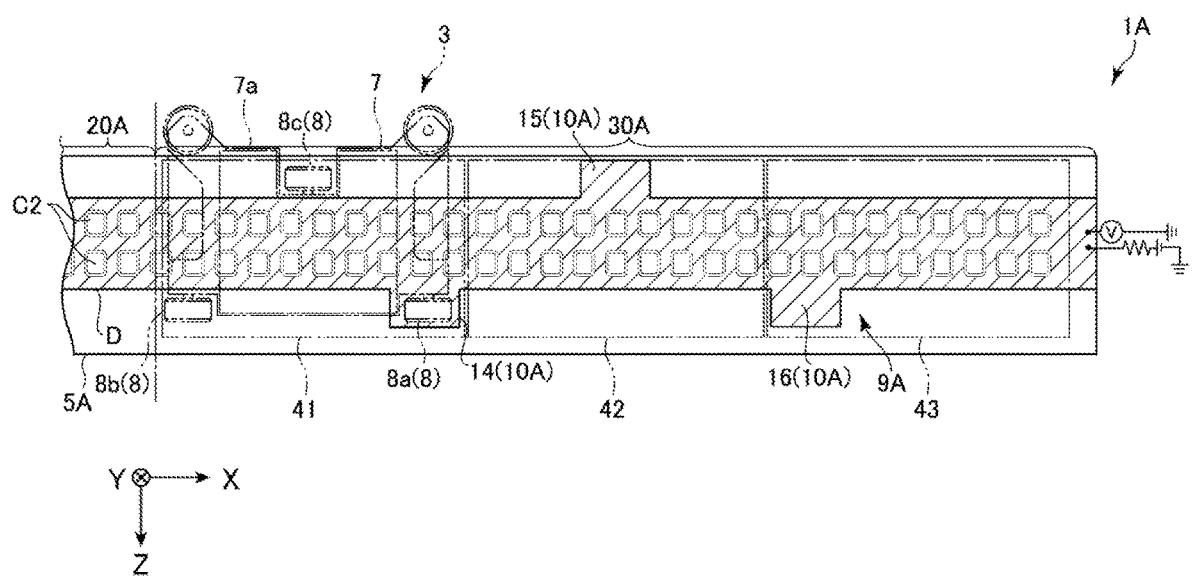
FIG. 7 is a diagram illustrating a relationship between a detector and a first sensing position in the encoder.
Figure 8:
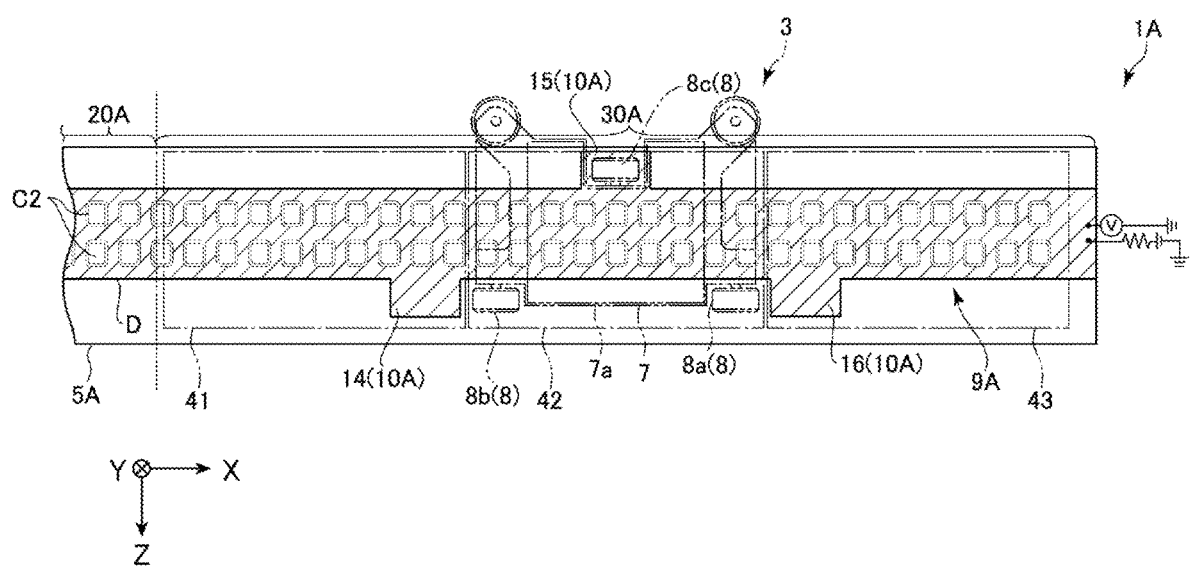
FIG. 8 is a diagram illustrating a relationship between a detector and a second sensing position in the encoder.
Figure 9:
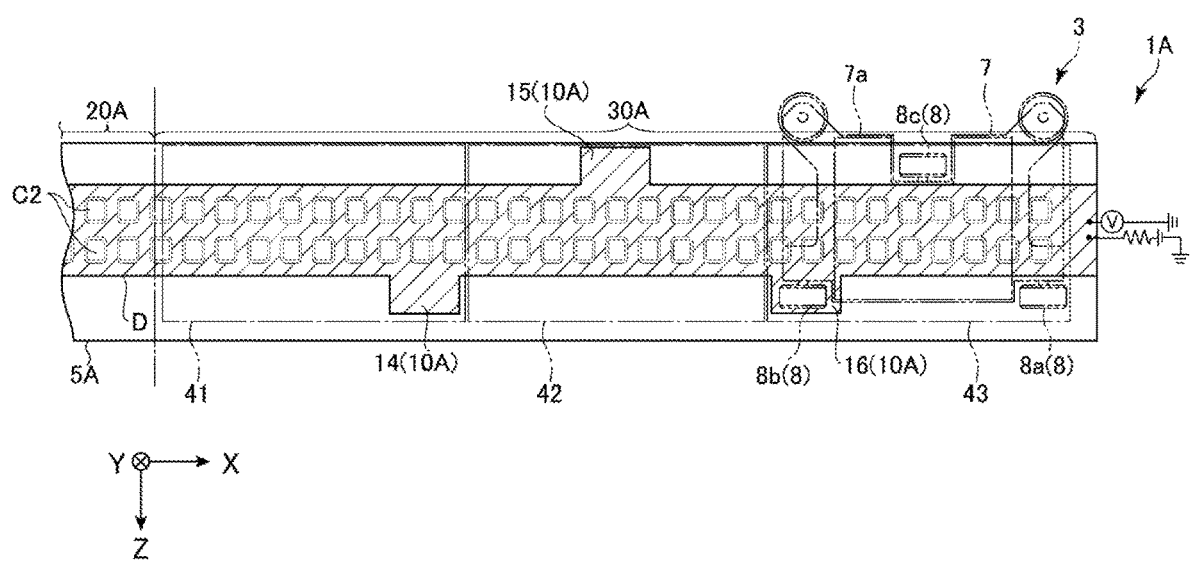
FIG. 9 is a diagram illustrating a relationship between a detector and a third sensing position in the encoder.
Figure 10:
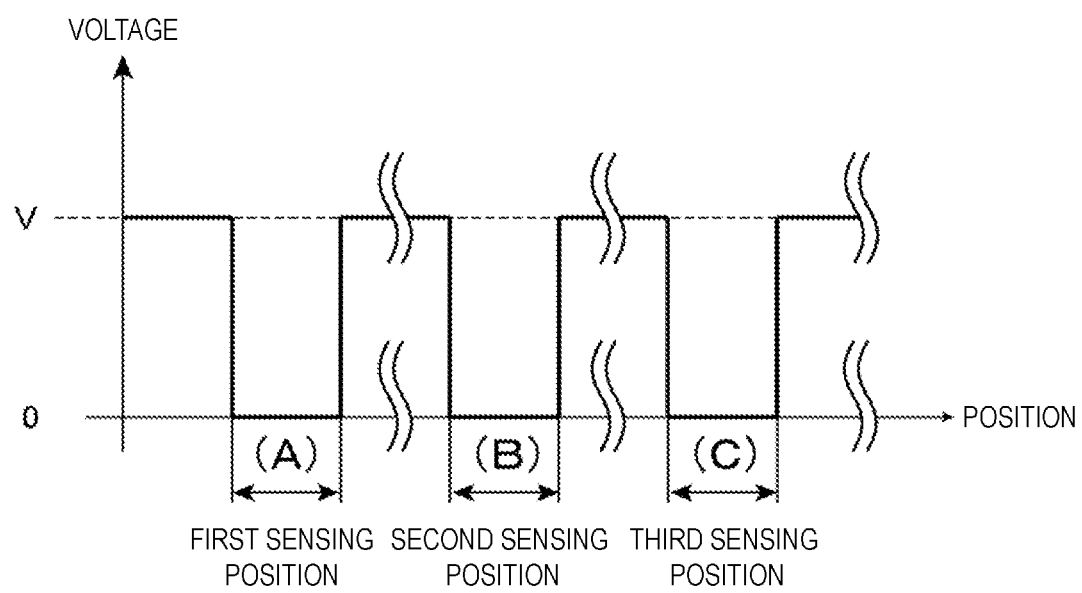
FIG. 10 is a diagram illustrating changes in voltage applied to sensing portions of the encoder.

FIGS. 7 to 9 are diagrams illustrating relationships between the detector and the sensing position in the encoder, and FIG. 10 is a diagram illustrating changes in the voltage applied to the sensing portions of the encoder.

Specifically, FIG. 7 is a diagram illustrating contact between the bearing 8a, which corresponds to the first rolling member, and the first sensing portion 14, at the first sensing position 41; FIG. 8 is a diagram illustrating contact between the bearing 8c, which corresponds to the second rolling member, and the second sensing portion 15, at the second sensing position 42; and FIG. 9 is a diagram illustrating contact between the bearing 8b, which corresponds to the third rolling member, and the third sensing portion 16, at the third sensing position 43. With respect to (A), (B), and (C) in FIG. 10, (A) corresponds to FIG. 7; (B) corresponds to FIG. 8; and (C) corresponds to FIG. 9. Changes in the voltage applied to the conductive layer D when the bearings 8 and the sensing portions 10A make contact will be described on the basis of FIGS. 7 to 10.

First, as illustrated in FIG. 7, the detection unit 7 is moved along the scale 5A in the +X direction. When the bearing 8a, which corresponds to the first rolling member, and the first sensing portion 14 make contact, the voltage applied to the conductive layer D changes to 0 in the case where the attitude of the detector 3 with respect to the scale 5A is normal, as indicated by (A) in FIG. 10.

Because the bearings 8 are grounded via the detector 3 and the other measurement target part W2, the conductive layer D is grounded when the bearings 8 and the conductive layer D are in contact. The voltage applied to the conductive layer D changes to 0 as a result of the grounding while the bearings 8 and the conductive layer D (the sensing portions 10A) are in contact. The charge in the scale 5A is thus discharged via the conductive layer D.

Next, as illustrated in FIG. 8, the detection unit 7 is moved toward the second sensing position 42. When the bearing 8b, which corresponds to the second rolling member, and the second sensing portion 15 make contact, the voltage applied to the conductive layer D changes to 0 in the case where the attitude of the detector 3 with respect to the scale 5A is normal, as indicated by (B) in FIG. 10.

Next, as illustrated in FIG. 9, the detection unit 7 is moved toward the third sensing position 43. When the bearing 8c, which corresponds to the third rolling member, and the third sensing portion 16 make contact, the voltage applied to the conductive layer D changes to 0 in the case where the attitude of the detector 3 with respect to the scale 5A is normal, as indicated by (C) in FIG. 10.

Figure 11:
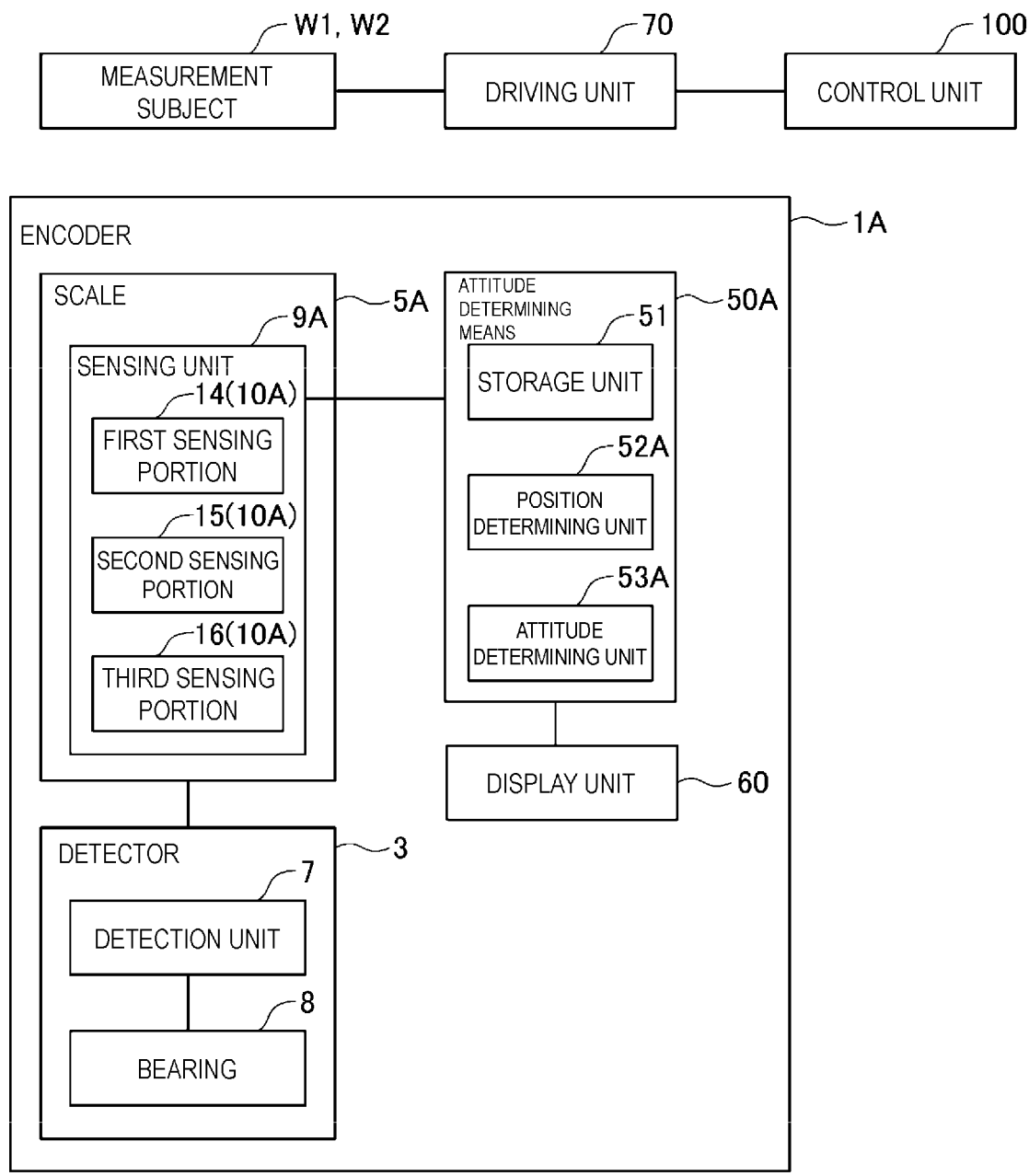
FIG. 11 is a block diagram illustrating the encoder.

FIG. 11 is a block diagram illustrating the encoder.

As illustrated in FIG. 11, the encoder 1A according to this embodiment has substantially the same configuration as that of the first embodiment, with the exception of the scale 5A and an attitude determining means 50A.

The sensing unit 9A included in the scale 5A further includes the first sensing portion 14, the second sensing portion 15, and the third sensing portion 16.

A position determining unit 52A of the attitude determining means 50A determines whether the detection unit 7 has moved to each of the first sensing position 41, the second sensing position 42, and the third sensing position 43. An attitude determining unit 53A determines whether the attitude of the detector 3 with respect to the scale 5A is normal or abnormal from the state of contact between the bearings 8 and the sensing portions 10A sensed by the sensing unit 9A at the first sensing position 41, the second sensing position 42, and the third sensing position 43.

Figure 12:
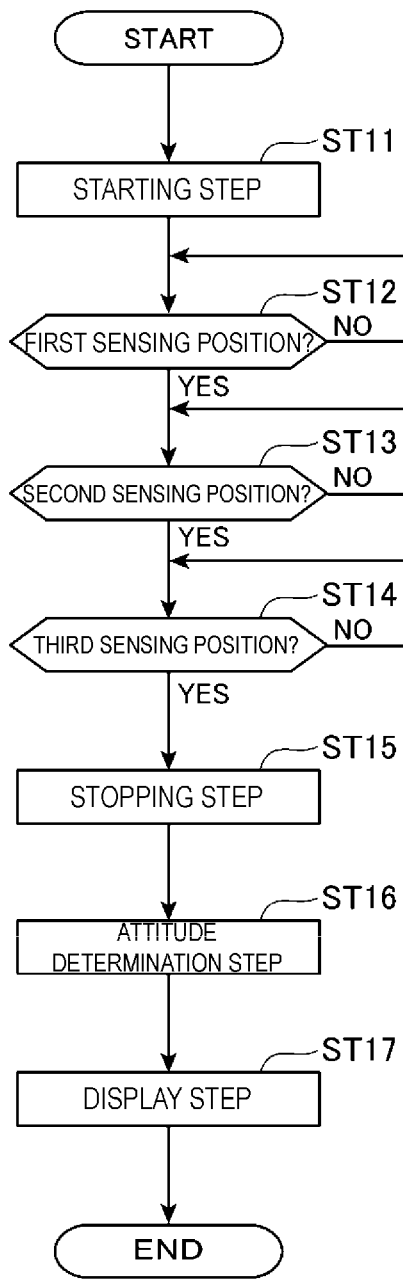
FIG. 12 is a flowchart illustrating a control method of the encoder.

FIG. 12 is a flowchart illustrating a control method of the encoder.

Operations through which the encoder 1A senses an abnormality in the attitude of the detector 3 will be described on the basis of FIG. 12.

As illustrated in FIG. 12, first, the control unit 100 executes a starting step of driving the other measurement target part W2 using the driving unit 70 and moving the detection unit 7 of the encoder 1A toward the sensing positions 41 to 43 within the sensing area 30A (step ST11).

Next, the position determining unit 52A determines whether the detection unit 7 has moved to the first sensing position 41 (step ST12). In the case where the position determining unit 52A determines that the detection unit 7 has not moved to the first sensing position 41 (NO in step ST12), the control unit 100 drives the driving unit 70 and moves the detection unit 7 until it is determined that the detection unit 7 has moved to the first sensing position 41. In the case where the position determining unit 52A determines that the detection unit 7 has moved to the first sensing position 41 (YES in step ST12), the control unit 100 drives the driving unit 70 and moves the detection unit 7 pass the first sensing position 41 and toward the second sensing position 42. At this time, a sensing result indicating whether the first sensing portion 14 provided in the first sensing position 41 has made contact with the bearing 8a, which corresponds to the first rolling member, is saved in the storage unit 51.

Next, the position determining unit 52A determines whether the detection unit 7 has moved to the second sensing position 42 (step ST13). In a case where the position determining unit 52A determines that the detection unit 7 has not moved to the second sensing position 42 (NO in step ST13), the control unit 100 drives the driving unit 70 and moves the detection unit 7 until it is determined that the detection unit 7 has moved to the second sensing position 42. In the case where the position determining unit 52A determines that the detection unit 7 has moved to the second sensing position 42 (YES in step ST13), the control unit 100 drives the driving unit 70 and moves the detection unit 7 pass the second sensing position 42 and toward the third sensing position 43. At this time, a sensing result indicating whether the second sensing portion 15 provided in the second sensing position 42 has made contact with the bearing 8c, which corresponds to the second rolling member, is saved in the storage unit 51.

Next, the position determining unit 52A determines whether the detection unit 7 has moved to the third sensing position 43 (step ST14). In the case where the position determining unit 52A determines that the detection unit 7 has not moved to the third sensing position 43 (NO in step ST14), the driving unit 70 is driven and the detection unit 7 is moved until it is determined that the detection unit 7 has moved to the third sensing position 43. In the case where the position determining unit 52A determines that the detection unit 7 has moved to the third sensing position 43 (YES in step ST14), the control unit 100 executes a stopping step of stopping the driving unit 70 so that the detection unit 7 stops at the third sensing position 43 (step ST15).

At this time, a sensing result indicating whether the third sensing portion 16 provided in the third sensing position 43 has made contact with the bearing 8b is saved in the storage unit 51.

Next, the attitude determining unit 53A executes an attitude determination step of determining whether the bearings 8a, 8b and 8c are in contact with the sensing portions 14, 15, and 16, respectively, at the first sensing position 41, the second sensing position 42, and the third sensing position 43 on the basis of the sensing results saved in the storage unit 51 (step ST16).

When the attitude determining unit 53A determines that the bearings 8a, 8b and 8c are in contact with the sensing portions 14, 15, and 16, respectively, the display unit 60 lights the blue LED up to indicate that the attitude of the detector 3 with respect to the scale 5A is normal (step ST17).

However, when the attitude determining unit 53A determines that any of the bearings 8a, 8b and 8c is not in contact with the sensing portions 14, 15, and 16, respectively, the display unit 60 lights the red LED up to indicate that the attitude of the detector 3 with respect to the scale 5A is abnormal (step ST17).

Note that as the attitude determination step, the attitude determining unit 53A may determine the manner in which the attitude of the detector 3 with respect to the scale 5A is abnormal from the bearings 8a, 8b and 8c and the sensing portions 14, 15, and 16 not in contact as sensed by the sensing unit 9A (step ST16), as described in the first embodiment.

According to this embodiment, the following effects can be achieved in addition to the same effects as (1) to (6) described in the first embodiment.

(9) Even in a case where individual voltages are not applied to each of the plurality of sensing portions 10A, in a case where only the first sensing portion 14 and the bearing 8a, which corresponds to the first rolling member, make contact at the first sensing position 41, and only the second sensing portion 15 and the bearing 8c, which corresponds to the second rolling member, make contact at the second sensing position 42, the sensing unit 9A can identify which of the bearings 8 is not in contact with the scale 5A.

(10) By identifying the bearings 8 not in contact with the scale 5A, the encoder 1A can sense in what manner the attitude of the detector 3 with respect to the scale 5A is skewed relative to the scale 5A.

(11) The first sensing portion 14 and the second sensing portion 15 can sense the attitude of the detector 3 with respect to the scale from a common voltage that is applied. Accordingly, it is not necessary to apply individual voltages to each of the plurality of sensing portions 10A, and thus the encoder 1A can achieve cost reduction.

(12) The bearings 8 are grounded to the other measurement target part W2 via the detector 3, and thus a charge of the scale 5A can be discharged simply by bringing the bearings 8 and the sensing portions 10A (the conductive layer D) into contact with each other.

Modified Examples of Embodiments

Note that the invention is not limited to the foregoing embodiments, and variations, improvements, and the like that fall within a scope in which the object of the invention can be achieved are also included within the invention.

For example, although the foregoing embodiments describe cases where the invention is applied in the encoders 1 and 1A, which are electromagnetic induction-type linear encoders, the encoders may be photoelectric-type linear encoders. In other words, it is sufficient that the encoders 1 and 1A include a detector provided movably in the encoder main unit 2, and the type, detection system, and the like of the detector are not particularly limited.

The encoders 1 and 1A may be rotary encoders rather than linear encoders. In this case, the detector moves along a circumferential direction of a scale base member, and a sensing area is provided in part of a measurement area formed along the circumferential direction of the scale base member.

In the foregoing embodiments, the sensing unit 9 or 9A senses the attitude of the detector 3 with respect to the scale 5 or 5A by bringing the bearings 8 into contact with the sensing portions 10 or 10A. However, the sensing unit may be any unit capable of sensing the attitude of the detector with respect to the scale, and for example, may be a sensor such as a gap sensor.

Additionally, although the bearings 8 are used as the rolling member in the foregoing embodiments, any configuration may be used as long as the sensing unit 9 or 9A are brought into contact with the sensing portions 10 or 10A by moving the detection unit 7.

In the foregoing embodiments, the sensing unit includes the sensing portions 10 or 10A for sensing whether contact is made with the bearings 8; however, the sensing portions may be sensors such as pressure sensors, contact sensors, or strain gauges. In other words, the sensing unit may have any configuration as long as an abnormality in the attitude of the detector with respect to the scale can be sensed by sensing whether a bearing, which is a rolling member, is in contact with the scale.

In the foregoing embodiments, the voltage applied to the sensing portions 10 or 10A changes to 0 by bringing the bearings 8 into contact with the sensing portions 10 or 10A, and the sensing unit 9 or 9A determines the attitude of the detector 3 with respect to the scale 5 or 5A on the basis thereof. However, the sensing unit may determine the attitude of the detector 3 on the basis of any value as long as the voltage applied to the sensing portions changes by bringing the rolling member into contact with the sensing portions.

In other words, the sensing portions 10 or 10A need not be grounded via the detector 3 and the other measurement target part W2.

In the foregoing embodiments, the sensing area 30 or 30A is formed in an end portion at one end side (the +X direction side) of the scale 5 or 5A in the longitudinal direction thereof; however, the sensing area 30 or 30A may be provided in an intermediate portion of the measurement area 20. Additionally, the sensing area 30 or 30A may be provided across a broader area than the measurement area 20, or the sensing area 30 or 30A and the measurement area 20 may be provided alternately.

Figure 13:
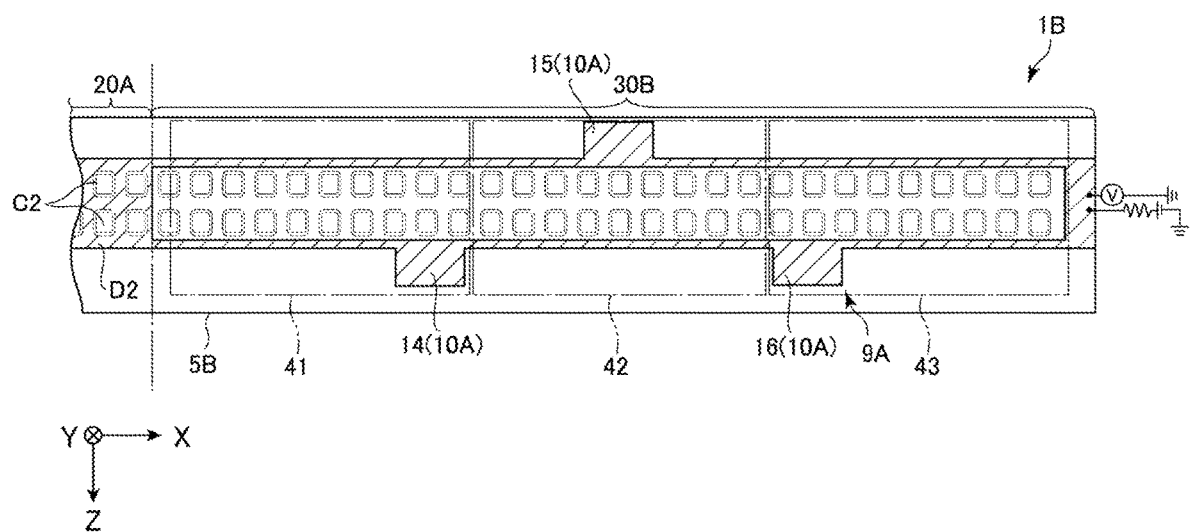
FIG. 13 is a diagram illustrating a sensing unit of a scale according to a first modified example.

FIG. 13 is a diagram illustrating a sensing unit of a scale according to a first modified example.

In the second embodiment, the conductive layer D of the encoder 1A is formed across both the measurement area 20A and the sensing area 30A.

However, as illustrated in FIG. 13, a conductive layer D2 of an encoder 1B according to the first modified example may be formed so as to connect the sensing portions 10A while avoiding the part corresponding to the marks C2 in a sensing area 30B of a scale 5B. In other words, in the case where the voltage is applied in common to the sensing portions 10A, the conductive layer may be formed in any manner as long as the conductive layer is not segmented.

Figure 14:
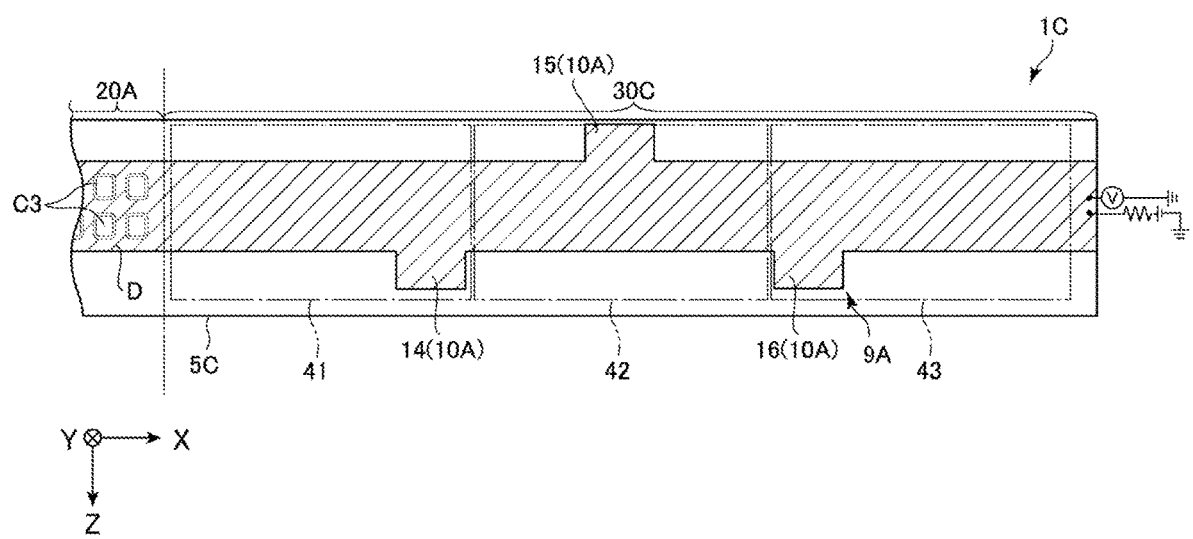
FIG. 14 is a diagram illustrating a sensing unit of a scale according to a second modified example.

FIG. 14 is a diagram illustrating a sensing unit of a scale according to a second modified example.

In the second embodiment, the marks C2 of a scale 5A are formed in both the measurement area 20A and the sensing area 30A.

However, as illustrated in FIG. 14, marks C3 of an encoder 1C according to the second modified example may be provided in a sensing area 30C. Additionally, in the case where the encoder 1C is a photoelectric-type linear encoder, the marks C3 provided in the sensing area 30C may be embedded or the like so as not to function.

Figure 15:
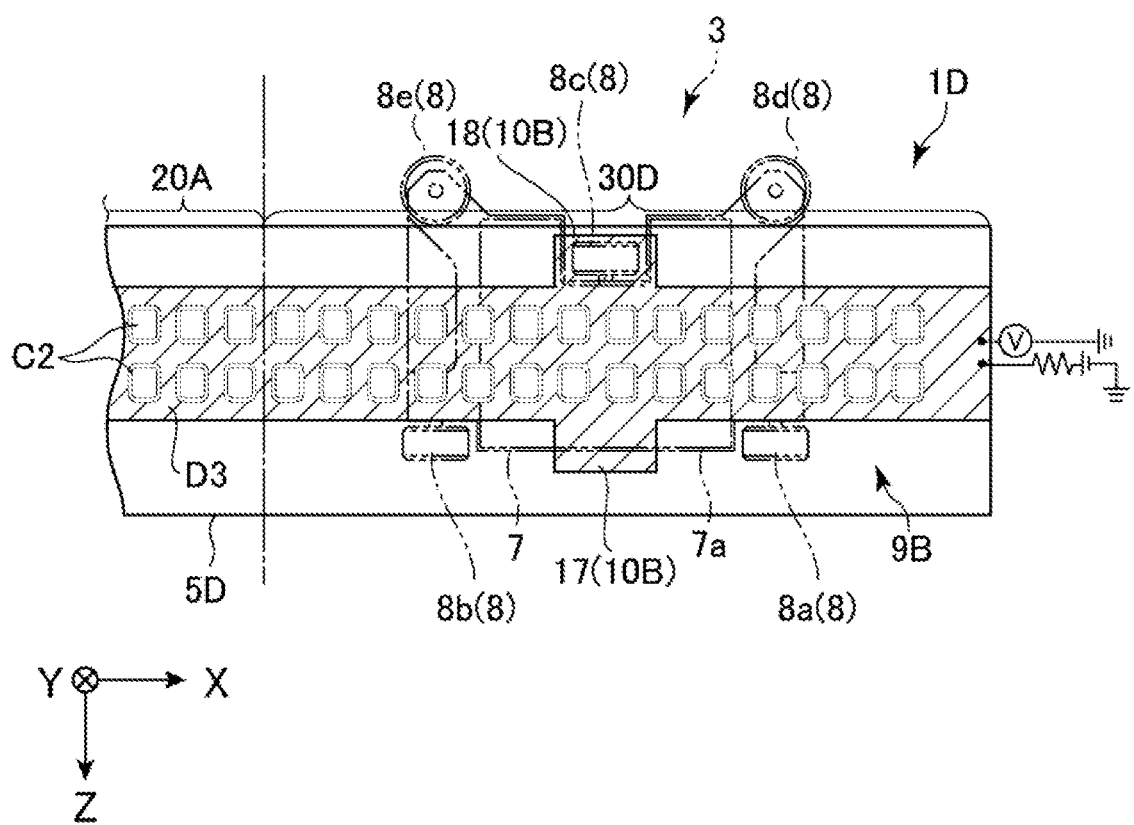
FIG. 15 is a diagram illustrating a sensing unit of a scale according to a third modified example.

FIG. 15 is a diagram illustrating a sensing unit of a scale according to a third modified example.

In the foregoing embodiments, the sensing area 30 or 30A in the scale 5 or 5A includes the sensing positions 40 or 41 to 43, but the sensing area need not include a sensing position.

As illustrated in FIG. 15, sensing unit 9B of an encoder 1D according to the third modified example includes sensing portions 10B formed extending from a conductive layer D3 in a direction (the Z direction) intersecting with the arrangement direction (the X direction) of the marks C2 of a scale 5D.

The sensing portions 10B include a first sensing portion 17 formed extending from the conductive layer D3 in the +Z direction and a second sensing portion 18 formed extending from the conductive layer D3 in the −Z direction.

According to this modified example, in the case where the attitude of the detector 3 with respect to the scale 5D is normal, first, the bearing 8a, which corresponds to the first rolling member, makes contact with the first sensing portion 17 in a sensing area 30D when the detection unit 7 is moved along the scale 5D in the +X direction. When the detection unit 7 continues to move along the scale 5D in the +X direction, the bearing 8c, which corresponds to the second rolling member, makes contact with the second sensing portion 18. When the detection unit 7 moves further along the scale 5D in the +X direction, the bearing 8b, which corresponds to the third rolling member, makes contact with the first sensing portion 17.

Thus, according to this configuration, the rolling members 8 make contact with the sensing portions 10B one at a time when the detection unit 7 is moved along the scale 5D in the X direction. As such, even in a case where a common voltage is applied to the conductive layer D3 and the sensing area 30D does not have a sensing position, an abnormality in the attitude of the detector 3 with respect to the scale 5D can be sensed.

Additionally, when the attitude of the detector 3 with respect to the scale 5D is abnormal, the bearings 8 not in contact with the scale 5D can be identified by comparing a measurement value read by the reading unit 7a with position information or the like stored in advance in the storage unit 51 or the like.

In the foregoing embodiments, the sensing portions 10 or 10A are formed on the face where the marks C or C2 are formed; however, the sensing portions 10 or 10A may be provided on a side face of the scale base member 5a so as to correspond to the bearings 8d and 8e. In other words, it is sufficient for the sensing portions 10 or 10A to be able to sense whether the attitude of the detector 3 with respect to the scale 5 or 5A is abnormal by making contact with the bearings 8.

In the second embodiment, the first rolling member corresponds to the bearing 8a and the second rolling member corresponds to the bearing 8c; however, the first rolling member may correspond to the bearing 8c and the second rolling member may correspond to the bearing 8b. In accordance therewith, the first sensing portion may be provided in the first sensing position and the second sensing position may be provided in the second sensing position.

Although the foregoing embodiments describe the plurality of sensing portions 10 or 10A as being three units, the sensing unit 9 or 9A may include three or more sensing portions.

INDUSTRIAL APPLICABILITY

As described thus far, the invention can be applied favorably in encoder control systems, encoders, and control methods of encoder control systems.

REFERENCE SIGNS LIST 1, 1A to 1D Encoder
3 Detector
5, 5A to 5D Scale
7 Detection unit
8 Bearing
9, 9A, 9B Sensing unit
10, 10A, 10B Sensing portion
20, 20A Measurement area
30, 30A to 30D Sensing area
40 Sensing position
41 First sensing position
42 Second sensing position
C, C2, C3 Mark
D, D2, D3 Conductive layer
W1, W2 Pair of measurement target parts

The invention claimed is:
1. An encoder comprising:
a scale provided on one measurement target part with marks arranged on the scale; and
a detector provided on another measurement target part and configured to detect an amount of relative movement with the scale, wherein the scale includes a sensing unit configured to determine whether the scale wherein the bearing is conductive is in direct contact with the detector;
the detector includes a bearing configured to roll in contact with the scale when the attitude is normal; and
the sensing unit is configured to sense an abnormality in the attitude of the detector with respect to the scale by sensing whether the rolling member is in contact with the scale.

2. The encoder according to claim 1,
wherein the detector includes a rolling member, the rolling member being conductive;
the sensing unit includes a sensing portion, the sensing portion having a film form and a voltage being applied to the sensing portion;
the sensing unit is configured to sense the rolling member as being in contact with the scale when the voltage applied to the sensing portion changes; and
the sensing unit is configured to sense the rolling member as not being in contact with the scale when the voltage applied to the sensing portion does not change.

3. The encoder according to claim 2,
wherein the scale includes:
a measurement area being an area where the amount of relative movement is detected by the detector from the marks; and
a sensing area being an area including the sensing unit and provided outside the measurement area.

4. The encoder according to claim 2,
wherein the detector includes the rolling member including a plurality of rolling members;
the scale includes a sensing position for the sensing unit to sense an abnormality in the attitude of the detector; and
the sensing unit includes the sensing portion including a plurality of sensing portions provided in positions, in the sensing position, that match with the plurality of rolling members, respectively.

5. The encoder according to claim 2,
wherein the detector includes a first rolling member and a second rolling member;
the scale includes a first sensing position and a second sensing position for the sensing unit to sense an abnormality in the attitude of the detector;
the sensing unit includes a first sensing portion provided in a position that matches only the first rolling member when the detector is located in the first sending position, and a second sensing portion provided in a position that matches only the second rolling member when the detector is located in the second sensing position; and
a common voltage is applied to the first sensing portion and the second sensing portion.

6. The encoder according to claim 2,
wherein the rolling member is grounded via the detector;
the sensing unit includes a conductive layer exhibiting conductivity formed on the scale along the arrangement direction of the marks; and
the sensing portion is formed extending from the conductive layer in a direction intersecting with the arrangement direction of the marks on the scale.

7. The encoder according to claim 1, wherein the bearing conductive.

8. An encoder comprising:
a scale provided on one measurement target part with marks arranged on the scale; and
a detector provided on another measurement target part and configured to detect an amount of relative movement with the scale,
wherein the scale includes a sensing unit configured to sense an abnormality in an attitude of the detector with respect to the scale;
the detector includes a rolling member, the rolling member being conductive;
the sensing unit includes a sensing portion, the sensing portion having a film form and a voltage being applied to the sensing portion;
the sensing unit is configured to sense the rolling member as being in contact with the scale when the voltage applied to the sensing portion changes; and
the sensing unit is configured to sense the rolling member as not being in contact with the scale when the voltage applied to the sensing portion does not change.

9. The encoder according to claim 8,
wherein the scale includes:
a measurement area being an area where the amount of relative movement is detected by the detector from the marks; and
a sensing area being an area including the sensing unit and provided outside the measurement area.

10. The encoder according to claim 8,
wherein the detector includes the rolling member including a plurality of rolling members;
the scale includes a sensing position for the sensing unit to sense an abnormality in the attitude of the detector; and
the sensing unit includes the sensing portion including a plurality of sensing portions provided in positions, in the sensing position, that match with the plurality of rolling members, respectively.

11. The encoder according to claim 8,
wherein the detector includes a first rolling member and a second rolling member;
the scale includes a first sensing position and a second sensing position for the sensing unit to sense an abnormality in the attitude of the detector;
the sensing unit includes a first sensing portion provided in a position that matches only the first rolling member when the detector is located in the first sending position, and a second sensing portion provided in a position that matches only the second rolling member when the detector is located in the second sensing position; and
a common voltage is applied to the first sensing portion and the second sensing portion.

12. The encoder according to claim 8,
wherein the rolling member is grounded via the detector;
the sensing unit includes a conductive layer exhibiting conductivity formed on the scale along the arrangement direction of the marks; and
the sensing portion is formed extending from the conductive layer in a direction intersecting with the arrangement direction of the marks on the scale.

* * * * *